United States Patent [19]

Inglis

[11] Patent Number: 4,560,230
[45] Date of Patent: Dec. 24, 1985

[54] BATTERY JUMP CABLE SYSTEM

[76] Inventor: Douglas R. Inglis, 4111 E. Packard Hwy., Charlotte, Mich. 48813

[21] Appl. No.: 600,576

[22] Filed: Apr. 16, 1984

[51] Int. Cl.[4] ............................................ H01R 11/26
[52] U.S. Cl. ................................................... 339/224
[58] Field of Search .............. 339/224, 225, 231–234, 339/263 B

[56] References Cited

U.S. PATENT DOCUMENTS 2,061,291  11/1936  Robinson ............................ 339/225
3,821,694   6/1974  Gottlieb ............................. 339/232
3,928,079  12/1975  Jennings et al. ..................... 339/224

*Primary Examiner*—Gil Weidenfeld
*Assistant Examiner*—Paula A. Austin
*Attorney, Agent, or Firm*—Beaman & Beaman

[57] ABSTRACT

A rechargeable battery cable connection system to facilitate the attachment of battery jumper cables or battery charging clamps to a rechargeable battery. The system utilizes a protuberance associated adjacent a battery terminal, the protuberance either constituting an extension defined upon the battery terminal, or defined upon the battery terminal clamp. The protuberance includes a recess receiving the jaws of the cable clamp.

2 Claims, 8 Drawing Figures

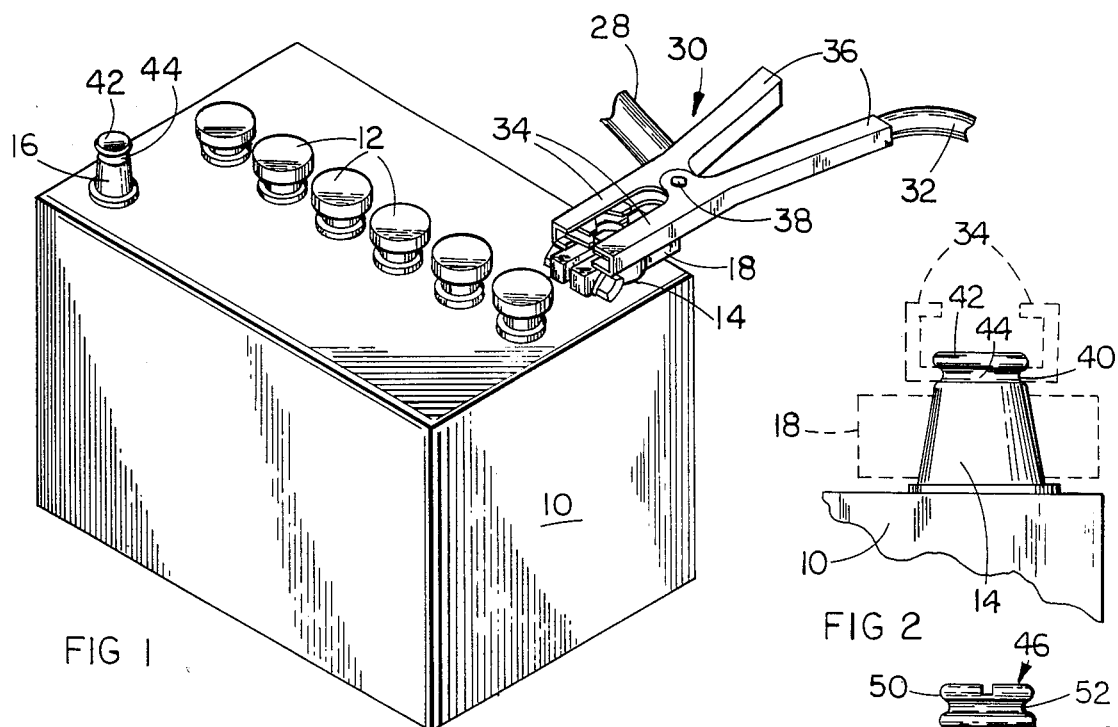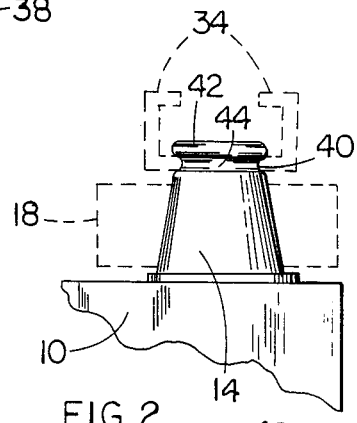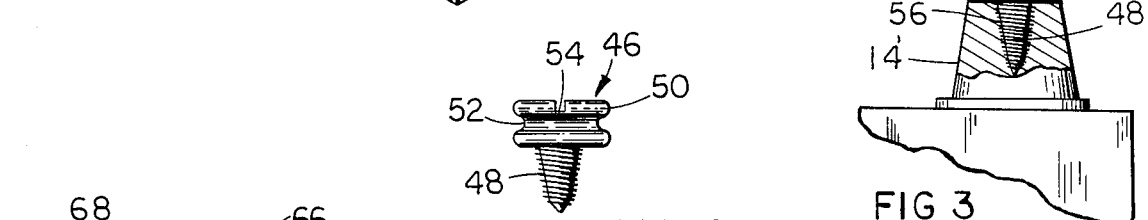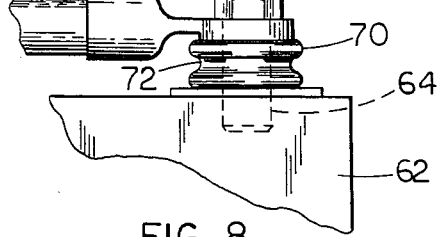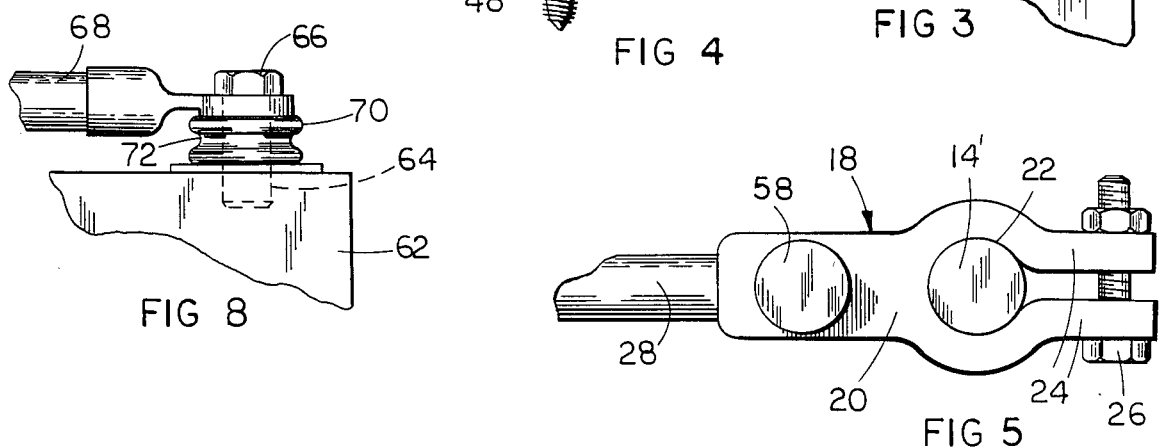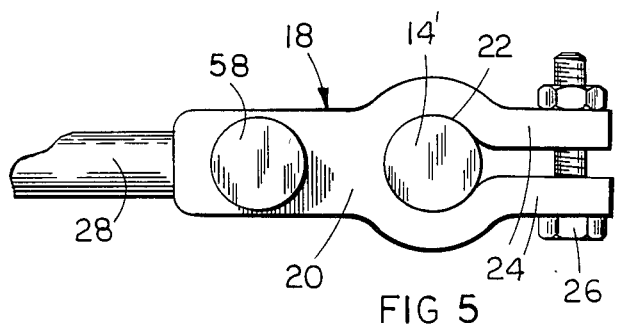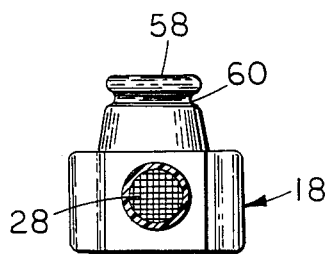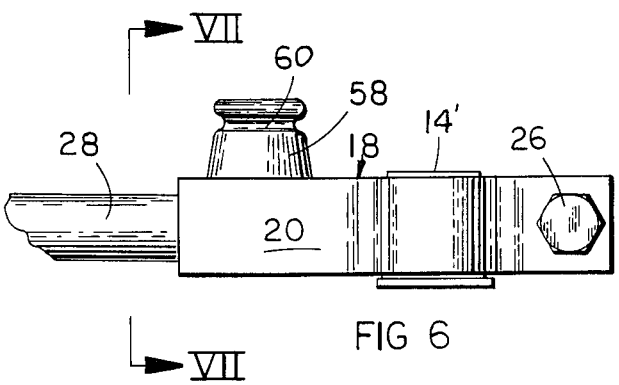

BATTERY JUMP CABLE SYSTEM

BACKGROUND OF THE INVENTION

Rechargeable storage batteries such as the types commonly used in vehicles, boats, airplanes, tractors and the like occasionally become discharged due to excessive electrical consumption, short circuits, light switches inadvertently left on, etc., and it is common practice to use jumper cables to temporarily connect the depleted storage battery to a charged battery. Battery jumper cables are commonly sold in automobile supply retail outlets and include a pair of heavy duty flexible conduits, color coded, having a clamp at each end for connecting to the battery terminals.

The use of jumper cables is often difficult as batteries do not have a terminal configuration readily grippable by the cable clamp. The spring biased cable clamp jaws may be readily opened, but as the battery terminal is usually encompassed by a battery terminal clamp of non-uniform configuration, it is often difficult to effectively attach the cable clamp to the terminal or terminal clamp, and several tries are often required before a proper electrical connection is made capable of starting the disabled vehicle. Similar problems are encountered when attaching battery charger clamps to battery terminals.

It is an object of the invention to provide means adjacent the terminals of rechargeable batteries for facilitating attachment of jumper cable clamps, or battery charging clamps, thereto for the purpose of establishing an effective electrical connection to the battery terminal.

Another object of the invention is to provide means for readily attaching a battery jumper cable to a battery terminal in electrical connection therewith wherein a safe, positive and effective mechanical connection between the jumper cable clamp and the terminal is readily achieved An additional object of the invention is to provide battery jumper clamp attachment means for a battery terminal which may be readily retrofitted to an existing battery terminal at little cost.

Another object of the invention is to provide means for facilitating attachment of jumper cable clamps to a battery terminal clamp.

Yet a further object of the invention is to provide means for rechargeable battery side mount terminals for facilitating attachment of battery jumper cables to side mount terminals in electrical conducting relationship thereto.

The inventive concept may take several forms. In its simplest form, the means for facilitating attachment of a battery jumper cable clamp to a battery terminal consists of a homogeneous extension defined upon the battery terminal which extends beyond the usual battery clamp and includes an annular groove capable of receiving the jaws of a jumper cable clamp. The addition of this battery terminal extension adds little cost to the battery construction, and yet effectively permits the battery cable clamp to be attached to the terminal and does not interfere with the mounting of battery clamps thereon.

A modification of the homogeneous terminal extension consists of an attachable and removable terminal extension in the form of a threaded member capable of being attached to the battery terminal after the battery is manufactured. The extension includes a threaded stem which coaxially screws into the terminal, and this embodiment of the invention permits the inventive concept to be retrofitted to existing installed batteries.

Another embodiment of the inventive concept lies in the location of the jumper cable gripping means to be homogeneously formed upon the usual battery terminal clamp, and in this embodiment the jumper cable clamp may be attached to a protuberance extending from the terminal clamp to establish electrical connection with the terminal.

A further embodiment of the invention consists of the utilization of an annular member coaxially defined about a battery side mount terminal having an annular groove for receiving the jumper cable clamp jaw to permit jumper cables to be readily attached to side-mounted batteries.

BRIEF DESCRIPTION OF THE DRAWINGS

The aforementioned objects and advantages of the invention will be appreciated from the following description and accompanying drawings wherein:

FIG. 1 is a perspective view of a typical storage battery utilizing the concepts of the invention, a jumper cable clamp being attached to a terminal, FIG. 2 is an enlarged, elevational view of a battery terminal having the jumper cable attachment means homogeneously defined thereon, a terminal clamp and cable clamp jaws being shown in dotted lines, FIG. 3 is an enlarged, elevational, partially sectioned variation of a terminal mounted jumper cable clamp post as mounted upon a terminal, FIG. 4 is an elevational view of the jumper cable clamp post, per se, illustrated in FIG. 3, FIG. 5 is a plan view of another embodiement of the inventive concept as mounted upon a battery terminal clamp, FIG. 6 is a side, elevational view of the embodiment of FIG. 5, FIG. 7 is an elevational, sectional view as taken along Section VII—VII of FIG. 6, and FIG. 8 is a plan view of another embodiment of the invention as used with a battery side mount installation.

DESCRIPTION OF THE PREFERRED EMBODIMENT

With reference to FIG. 1, a typical storage battery 10 of the rechargeable type is illustrated which includes a plurality of cells, usually six in number, having access ports 12 for refilling the cells with water. The battery includes two terminals, a positive terminal 14, and a negative terminal 16. Under battery standards, the positive terminal is of slightly larger diametrical dimension than the negative terminal. The terminals are usually formed of lead, and are of a conical configuration for receiving the typical battery terminal clamp 18, as shown mounted upon the terminal 14. The battery clamp 18 includes a body 20 in which a recess 22 is defined therein for receiving the terminal, FIG. 5, and body ears 24 may be drawn toward each other by the nut and bolt 26 to permit the clamp to be tightened upon the terminal in the well known manner. A battery cable 28 is attached to the clamp 18 for connection to the vehicle electrical system.

A typical battery jumper cable clamp 30 is shown in FIG. 1. Such a jumper cable clamp includes a cable 32 connected to a pliers type clamp 30 wherein jaws 34 includes handles 36 and are pivotally interconnected by a pivot pin 38. A spring, not shown, pivots the jaws 34 toward each other, and the jaws usually include some type of serrated configuration and relatively sharp edges 40 for facilitating the gripping of the battery clamp or terminal.

In the practice of the invention as illustrated in FIGS. 1 and 2, the terminals 14 and 16 are each provided with an extension 42 which extends above the configuration of the associated battery clamp as shown in dotted lines, FIG. 2. The extension 42 is homogeneously formed of the lead material of the terminal and is of a circular configuration and includes an annular recess 44 throughout its circumference. Thus, as the recess 44 is located above the battery clamp, the jumper cable clamp jaws 34 may readily enter the recess to establish an effective electrical connection to the terminal. The configuration of the recess will prevent the battery cable jaws from slipping from the terminal, and the post protuberance defined by the extension 42 renders attachment of battery clamps to the terminal easy and effective.

A variation of the inventive concepts of FIGS. 1 and 2 is shown in FIGS. 3 and 4 wherein the extending protuberance on the terminal is not homogeneous with the terminal, but is attached to the terminal after the terminal is formed. The protuberance post 46 includes a threaded stem 48 depending from a circular head 50 having an annular recess 52 defined therein. A screwdriver slot 54 is diametrically defined in the end of the head permitting rotation of the post. By drilling the terminal 14' with a conical concentric bore 56, FIG. 3, the stem 48 may be readily threaded into the bore and the post attached to the end of the terminal for use with the jumper cable clamp in a manner identical to that described with respect to FIGS. 1 and 2.

It is to be noted in the embodiments of FIGS. 1-4 that the diameter of the protuberance at the outer ends of the terminal must be less than the portion of the terminal to which the battery clamp is attached to insure that the protuberance does not interfere with the attachment of the terminal clamp 18 to the terminal.

In the embodiment of FIGS. 5-7, the protuberance post 58 is homogeneously molded of the material of the battery terminal clamp 18. The protuberance includes an annular recess 60, and the cable clamp jaws 34 may be attached to the protuberance post within the recess 60 in the identical manner to that described above.

Automobile storage batteries now include styles having side-mount terminals, and such terminals consist of a socket located in the side of the battery 62, FIG. 8, having a threaded hole 64 for receiving a bolt 66 connected to the end of the battery cable 68. To practice the inventive concepts with a side-mount battery terminal, an annular protuberance post 70 is defined upon the terminal in the form of a ring concentric to the terminal threaded hole 64, and even with the bolt 66 attached to the terminal, the annular recess 72 defined in the post permits the jaws of the jumper cable clamp to be readily attached to the side-mount type terminal.

In the drawings, four embodiments of the inventive concept have been illustrated, and it is appreciated that other forms of the inventive concept may be apparent to those skilled in the art without departing from the spirit and scope of the invention.

I claim:

1. A battery jump cable connection system for rechargeable batteries comprising, in combination, a frusto-conical battery terminal of electrically conductive material having an axis, an inner maximum diameter region and an outer minimum diameter end, a circular extension defined on said outer end concentric to said axis and of a diameter no greater than the diameter of said outer end, said extension being homogeneously formed of the material of said terminal, and a circular recess defined in said extension concentric to said terminal axis and of such radial depth to receive and retain the jaws of a battery jump cable clamp therein.

2. A battery jump cable connection system for rechargeable batteries wherein the batteries include frustoconical terminals comprising, in combination, a battery terminal clamp having an elongated body of electrically conductive material defining a length, a frusto-conical socket defined in said body transverse to said length for receiving a battery terminal, means defined on said body for circumferentially constricting said socket, a battery cable affixed to said body in electrical conducting relationship therewith, an elongated electrical conducting protuberance post extending from said body in electrical conducting relationship therewith having an axis transversely disposed to said body length, said post being homogeneously formed of the material of said clamp body and having a free outer end region of circular configuration, and a circular recess concentrically defined in said post outer end region of such depth to receive and retain the jaws of a battery jump cable clamp therein.

* * * * *